(12) United States Patent
Walker et al.

(10) Patent No.: US 8,185,401 B2
(45) Date of Patent: *May 22, 2012

(54) AUTOMATED SENTENCE PLANNING IN A TASK CLASSIFICATION SYSTEM

(75) Inventors: Marilyn A. Walker, Morristown, NJ (US); Owen Christopher Rambow, Hoboken, NJ (US); Monica Rogati, Pittsburgh, PA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/789,883

(22) Filed: May 28, 2010

(65) Prior Publication Data

US 2010/0241420 A1    Sep. 23, 2010

Related U.S. Application Data

(63) Continuation of application No. 10/258,776, filed as application No. PCT/US02/07235 on Mar. 11, 2002, now Pat. No. 7,729,918.

(60) Provisional application No. 60/275,653, filed on Mar. 14, 2001.

(51) Int. Cl.
  *G10L 21/06* (2006.01)
  *G10L 21/00* (2006.01)
  *G06F 17/27* (2006.01)

(52) U.S. Cl. .......... 704/275; 704/270; 704/9; 704/270.1

(58) Field of Classification Search ....... 704/9, 270–275
See application file for complete search history.

(56) References Cited

U.S. PATENT DOCUMENTS

| | | | |
|---|---|---|---|
| 4,624,010 | A | 11/1986 | Takebayashi |
| 5,029,085 | A | 7/1991 | Ito |
| 5,357,596 | A | 10/1994 | Takebayashi et al. |
| 5,574,726 | A | 11/1996 | Chan et al. |
| 5,577,165 | A | 11/1996 | Takebayashi et al. |
| 5,580,063 | A | 12/1996 | Edwards |
| 5,671,329 | A | 9/1997 | Hatazaki |
| 5,675,707 | A | 10/1997 | Gorin et al. |
| 5,694,558 | A | 12/1997 | Sparks et al. |
| 5,745,877 | A | 4/1998 | Nijmam et al. |
| 5,754,726 | A | 5/1998 | Peterson et al. |
| 5,794,193 | A | 8/1998 | Gorin |

(Continued)

FOREIGN PATENT DOCUMENTS

EP   1045373   10/2000

(Continued)

OTHER PUBLICATIONS

Alice H. Oh, "Stochastic Language Generation for Spoken Dialogue Systems", NAACL, 2000.*

(Continued)

*Primary Examiner* — Eric Yen

(57) ABSTRACT

The invention relates to a system that interacts with a user in an automated dialog system (100). The system may include a communicative goal generator (210) that generates communicative goals based on a first communication received from the user. The generated communicative goals (210) may be related to information needed to be obtained from the user. The system may further include a sentence planning unit (220) that automatically plans one or more sentences based on the communicative goals generated by the communicative goal generator (210). At least one of the planned sentences may be then output to the user (230).

22 Claims, 9 Drawing Sheets

U.S. PATENT DOCUMENTS

| | | | |
|---|---|---|---|
| 5,860,059 A * | 1/1999 | Aust et al. | 704/231 |
| 5,860,063 A | 1/1999 | Gorin et al. | |
| 5,899,971 A | 5/1999 | DeVos | |
| 5,999,904 A | 12/1999 | Brown et al. | |
| 6,018,774 A | 1/2000 | Mayle et al. | |
| 6,035,267 A | 3/2000 | Watanabe et al. | |
| 6,044,337 A | 3/2000 | Gorin et al. | |
| 6,044,347 A | 3/2000 | Abella et al. | |
| 6,192,110 B1 | 2/2001 | Abella et al. | |
| 6,199,044 B1 | 3/2001 | Ackley et al. | |
| 6,219,643 B1 | 4/2001 | Cohen et al. | |
| 6,233,561 B1 | 5/2001 | Junqua et al. | |
| 6,275,788 B1 | 8/2001 | Watanabe et al. | |
| 6,314,402 B1 | 11/2001 | Monaco et al. | |
| 6,324,512 B1 | 11/2001 | Junqua et al. | |
| 6,324,513 B1 | 11/2001 | Nagai et al. | |
| 6,356,869 B1 | 3/2002 | Chapados et al. | |
| 6,385,584 B1 | 5/2002 | McAllister et al. | |
| 6,418,440 B1 | 7/2002 | Kuo et al. | |
| 6,434,525 B1 | 8/2002 | Nagisa et al. | |
| 6,493,671 B1 * | 12/2002 | Ladd et al. | 704/270 |
| 6,507,643 B1 | 1/2003 | Groner | |
| 6,510,411 B1 | 1/2003 | Norton et al. | |
| 6,526,382 B1 * | 2/2003 | Yuschik | 704/275 |
| 6,553,345 B1 | 4/2003 | Kuhn et al. | |
| 6,567,787 B1 | 5/2003 | Walker et al. | |
| 6,570,555 B1 | 5/2003 | Prevost et al. | |
| 6,598,022 B2 | 7/2003 | Yuschik | |
| 6,601,029 B1 | 7/2003 | Pickering | |
| 6,631,346 B1 | 10/2003 | Karaorman et al. | |
| 6,711,585 B1 | 3/2004 | Copperman et al. | |
| 6,941,266 B1 | 9/2005 | Gorin et al. | |
| 6,944,592 B1 | 9/2005 | Pickering | |
| 7,003,445 B2 | 2/2006 | Humphreys et al. | |
| 7,043,435 B2 | 5/2006 | Knott et al. | |
| 2003/0216923 A1 | 11/2003 | Gilmore et al. | |
| 2005/0033582 A1 | 2/2005 | Gadd et al. | |

FOREIGN PATENT DOCUMENTS

| | | |
|---|---|---|
| WO | 00/05643 | 2/2000 |
| WO | 00/22549 | 4/2000 |

OTHER PUBLICATIONS

Michel Galley et al., "Hybrid Natural Language Generation for Spoken Dialogue Systems", Eurospeech 2001.

Owen Rambow et al., "applied Text Generation", ACL, 1992.

S. Seneff, "Response planning and generation in the Mercury flight reservation system", Elsevier Science, 2002.

* cited by examiner

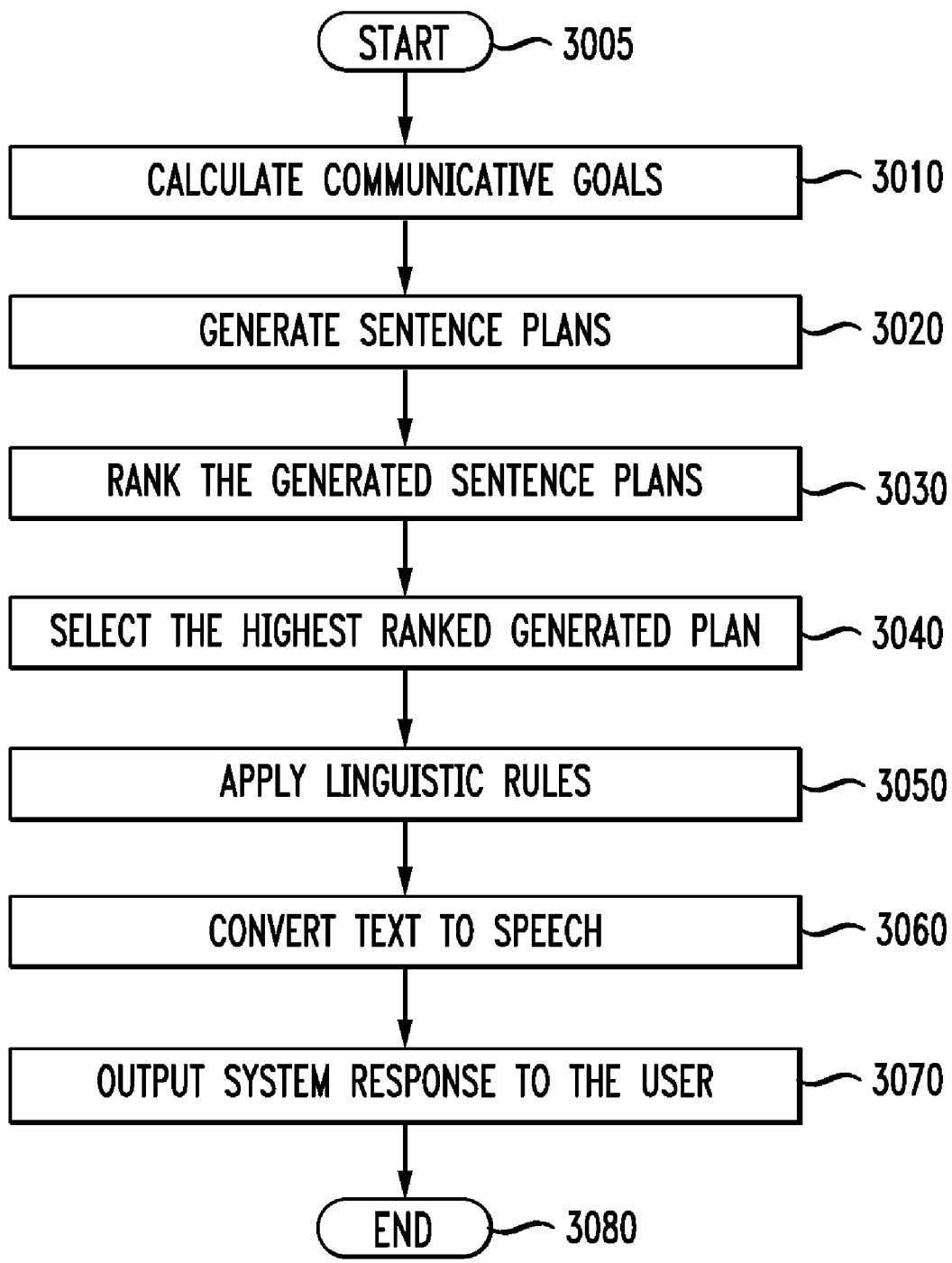

FIG. 4

| RULE | ARG 1 | ARG 2 | Result |
|---|---|---|---|
| MERGE | You are leaving from Newark. | You are leaving at 5 | You are at 5 from Newark |
| MERGE-GENERAL | What time would you like to leave? | You are leaving from Newark. | What time would you like to leave from Newark? |
| SOFT-MERGE | You are leaving from Newark | You are going to Dallas | You are traveling from Newark to Dallas |
| SOFT-MERGE-GENERAL | What time would you like to leave? | You are going to Dallas | What time would you like to fly to Dallas? |
| CONJUNCTION | You are leaving from Newark. | You are going to Dallas | You are leaving from Newark and you are going to Dallas. |
| RELATIVE-CLAUSE | Your flight leaves at 5. | Your flight arrives at 9. | Your flight, which leases at 5, arrives at 9. |
| ADJECTIVE | Your flight leaves at 5 | Your flight is nonstop. | Your nonstop flight leaves at 5. |
| PERIOD | You are leaving from Newark. | You are going to Dallas. | You are leaving from Newark. You are going to Dallas |

FIG. 8

| N | CONDITION | A0 | A5 | A8 | $\alpha_s$ |
|---|---|---|---|---|---|
| 1 | LEAF-IMPLICIT-CONFIRM $\geq$ 1 | 1 | 1 | 1 | 0.94 |
| 2 | DSYNT-TRAVERSAL-PRONOUN $\geq$ 2 | 1 | 2 | 4 | -0.85 |
| 3 | LEAF-IMPLICIT-CONFIRM*IMPLICIT-CONFIRM*REQUEST*IMPLICIT-CONFIRM $\geq$ 1 | 1 | 0 | 0 | -0.52 |
| 4 | DSYNT-TRAVERSAL-IN1 $\geq$ 1 | 0 | 0 | 1 | -0.52 |
| 5 | DSYNT-TRAVERSAL-PRONOUN $\geq$ 3 | 1 | 2 | 4 | -0.34 |
| 6 | SP-ANCESTOR*IMPLICIT-CONFIRM-ORIG-CITY*SOFT-MERGE-GENERAL*SOFT-MERGE-GENERAL $\geq$ 1 | 1 | 1 | 0 | 0.33 |
| 7 | SP-ANCESTOR_SOFT-MERGE-GENERAL*PERIOD $\geq$ 1 | 0 | 1 | 0 | 0.21 |
| 8 | DSYNT-ANCESTOR-IN1*LEAVE $\geq$ 1 | 0 | 0 | 1 | -0.16 |
| 9 | SP-TRAVERSAL-IMPLICIT-CONFIRM-DAY-NUMBER $\geq$ 1 | 1 | 1 | 1 | -0.13 |
| 10 | SP-TRAVERSAL-SOFT-MERGE*IMPLICIT-CONFIRM*IMPLICIT-CONFIRM $\geq$ 1 | 1 | 0 | 0 | 0.11 |
| 11 | REL-CLAUSE-AVG $\geq$ 2 | 0 | 0 | 3 | -0.12 |
| 12 | PERIOD-AVG $\geq$ 3 | 0 | 5 | 3.5 | 0.12 |
| 13 | DSYNT-ANCESTOR-TRAVEL*LIKE $\geq$ 1 | 1 | 0 | 0 | 0.10 |
| 14 | DSYNT-SISTERS-PRONOUN-ON1 $\geq$ 1 | 0 | 1 | 1 | -0.10 |
| 15 | LEAF-IMPLICIT-CONFIRM*IMPLICIT-CONFIRM*REQUEST $\geq$ 1 | 1 | 0 | 0 | -0.10 |
| 16 | REL-CLAUSE-MIN $\geq$ 2 | 0 | 0 | 3 | -0.09 |
| 17 | SP-SISTERS-IMPLICIT-CONFIRM*IMPLICIT-CONFIRM- $\geq$ 1 | 2 | 2 | 2 | 0.09 |
| 18 | REL-CLAUSE-MAX $\geq$ 2 | 0 | 0 | 3 | -0.07 |
| 19 | SP-ANCESTOR-IMPLICIT-CONFIRM*SOFT-MERGE*SOFT-MERGE-GENERAL $\geq$ 1 | 1 | 0 | 0 | 0.06 |

AUTOMATED SENTENCE PLANNING IN A TASK CLASSIFICATION SYSTEM

CLAIM FOR PRIORITY/CROSS REFERENCE TO RELATED APPLICATIONS

This application is a continuation of U.S. patent application Ser. No. 10/258,776, filed Oct. 29, 2002, which is a national stage application of PCT/US02/07237, filed Mar. 11, 2002, which claims the benefit of U.S. Provisional Patent Application No. 60/275,653, filed Mar. 14, 2001, which are incorporated by reference in their entirety.

TECHNICAL FIELD

This invention relates to automated systems for communication recognition and understanding.

BACKGROUND OF THE INVENTION

The past several years have seen a large increase in commercial spoken dialog systems. These systems typically utilize system-initiative dialog strategies. The system utterances are highly scripted for style and then recorded by voice talent. However several factors argue against the continued use of these simple techniques for producing the system side of the conversation. First, the quality of text-to-speech systems has improved to the point of being a viable alternative to prerecorded prompts. Second, there is a perceived need for spoken dialog systems to be more flexible and support user initiative. However, this factor also requires greater flexibility for system utterance generation. Finally, there are dialog systems that support complex planning currently under development, and these systems are likely to require more sophisticated system output than current technologies will be able to provide.

SUMMARY OF THE INVENTION

The invention relates to a system that interacts with a user in an automated dialog system. The system may include a communicative goal generator that generates communicative goals based on a first communication received from the user. The generated communicative goals may be related to information needed to be obtained from the user. The system may further include a sentence planning unit that may automatically plan one or more sentences based on the communicative goals generated by the communicative goal generator. At least one of the planned sentences may be then output to the user.

BRIEF DESCRIPTION OF THE DRAWINGS

FIG. 3 illustrates an exemplary sentence planning system process;
FIG. 4 illustrates a list of clause combining operations with examples;
FIG. 8 illustrates rules with the largest impact on the final rank booster score.

DETAILED DESCRIPTION

Figure 1:
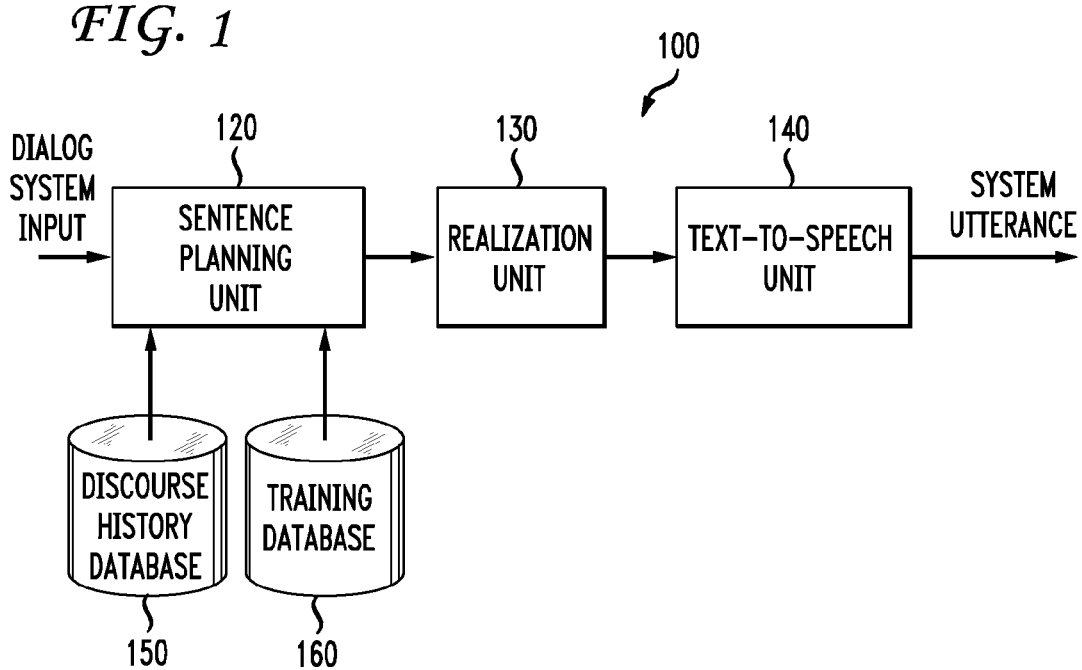
FIG. 1 illustrates an exemplary sentence planning system.

Sentence planning is a set of inter-related but distinct tasks, one of which is sentence scoping. Sentence scoping relates to the choice of syntactic structure for elementary speech acts and the decisions concerning how to combine them into sentences. For example, consider the required capabilities of a sentence planning system for a mixed-initiative spoken dialog system for travel planning in the sample dialog below:

1) System: Welcome . . . What airport would you like to fly out of?
2) User: I need to go to Columbus.
3) System: Flying to Columbus. What departure airport was that?
4) User: From Washington on September the 6th.
5) System: What time would you like to travel on September the 6th to Columbus from Washington?

In utterance 1), the system requests information about the user's departure airport, but in the user's response 2), the user takes the initiative to provide information about a destination. In the system's utterance 3), the system's goal is to implicitly confirm the destination (because of the possibility of error in the speech recognition component), and to also request information (for the second time) concerning the caller's departure airport. In the user's response 4), the caller provides the requested information but also provides the month and day of travel. Given the system's dialog strategy, the communicative goals for the system's utterance 5) are to implicitly confirm all of the information that the user has provided so far, i.e., the departure and destination cities, and the month and day of travel, as well as to request information about the time of travel. The system's representation of its communicative goals for the system's utterances is illustrated in Table 1 below:

TABLE 1

| The Communicative Goals for System Utterance 5. Above. |
|---|
| implicit-confirm(orig-city: WASHINGTON) |
| implicit-confirm(dest-city: COLUMBUS) |
| implicit-confirm(month: 9) |
| implicit-confirm(day-number: 6) |
| request(depart-time: whatever) |

An important job for the sentence planning system is to decide among the large number of potential realizations of these communicative goals. Some example alternative realizations are found in Table 2 below:

TABLE 2

| Alternative Sentence Plan Realizations for the Communicative Goals for System Utterance 5 in the Sample Dialog. Above | | | |
|---|---|---|---|
| Alt | Realization | H | MLP |
| 0 | What time would you like to travel on September 6th to Columbus from Washington? | 5 | .85 |
| 5 | Leaving on September 6th. What time would you like to travel from Washington to Columbus? | 4.5 | .82 |
| 8 | Leaving in September. Leaving on the 6th. What time would you, travelling from Washington to Columbus, like to leave? | 2 | .39 |

FIG. 1 illustrates an exemplary sentence planning system 100 which may be used in the above sentence planning scenario as well as in many other various applications, including customer care, service or parts ordering, travel arrangements bookings, location/map information, etc. As shown in the figure, the sentence planning system 100 may include a sentence planning unit 120, a realization unit 130, a text-to-speech unit 140, a discourse history database 150, and a training database 160.

The sentence planning system 100 receives input recognition and understanding data from a dialog system that is based on input communications from the user. The dialog system may be any system that may be trained to recognize and understand any number of communication symbols, both acoustic and non-acoustic, including grammar fragments, meaningful words, meaningful phrases, meaningful phrase clusters, superwords, morphemes, multimodal signals, etc., using any of the methods known to one skilled in the art including those found in U.S. Pat. Nos. 5,675,707, 5,860,063 and 6,044,337, and U.S. patent application Ser. No. 08/943, 944, Ser. No. 09/712,192 and Ser. No. 09/712,194, which are hereby incorporated by reference in their entirety. For example, the dialog system may operate using one or more of a variety of recognition and understanding algorithms to determine whether the user's input communications have been recognized and understood prior to inputting data to the sentence planning system 100.

In the sentence planning system 100, the discourse history database 150 serves as a database for storing each dialog exchange for a particular dialog or set of interactions with a user. The training database 160 stores sentence planning examples collected from interactions with human users and models built based on those examples and positive and negative feedback on the quality of the examples that was provided by human users during the training phase. The training database 150 also stores the sentence planning features identified from the collected dialogs, and the sentence planning rules generated from both the dialogs and the sentence planning features. The sentence planning unit 120 exploits the training database 160 by using the dialog history stored in the discourse history database 150 to predict what sentence plan to generate for the current user interaction.

While the discourse history database 150 and the training database 160 are shown as separate databases in the exemplary embodiments, the dialog history and training data may be stored in the same database or memory, for example. In any case, any of the databases or memories used by the sentence planning system 100 may be stored external or internal to the system 100.

Figure 2:
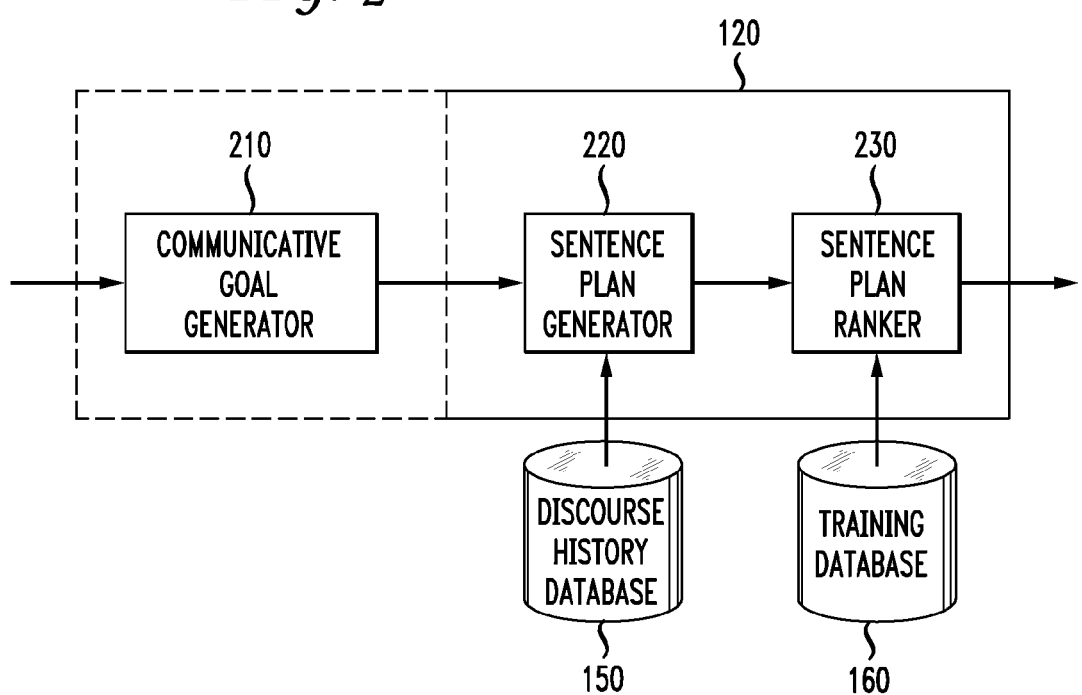
FIG. 2 illustrates an exemplary sentence planning unit.

FIG. 2 is a more detailed diagram of an exemplary sentence planning unit 120 shown in FIG. 1. The sentence planning unit 120 may include a communicative goal generator 210, a sentence plan generator 220 and a sentence plan ranker 230. The sentence plan generator 220 also receives input from the discourse history database 150 and the sentence plan ranker 230 also receives input from the training database 160.

The communicative goal generator 210 applies a particular dialog strategy to determine what the communicative goals should be for the system's next dialog turn. Although shown in FIG. 2 as part of the sentence planning unit 120, in another exemplary embodiment (shown by the dotted line), the communicative goal generator 210 may be separate from the sentence planning unit 120 and as such, may be a component of a dialog manager for an automated dialog system, for example (e.g., see FIG. 9). While traditional dialog managers used in conventional spoken dialog systems express communicative goals by looking up string templates that realize these goals and then simply pass the strings to a text-to-speech engine, the communicative goal generator 210 in the present invention generates semantic representations of communicative goals, such as those shown in Table 1.

These semantic representations are passed to the sentence planning unit 120 that can then use linguistic knowledge and prior training to determine the best realization for these communicative goals given the current discourse context, discourse history, and user. While the communicative goal generator 210 may or may not be physically located in the sentence planning unit 120, or even be a part of the sentence planning system 100, within the spirit and scope of the invention, for ease of discussion, the communicative goal generator 210 will be discussed as being part of the sentence planning unit 120.

In order to train the sentence planning system 100, the sentence planning process may include two distinct phases performed by the sentence plan generator 220 and the sentence plan ranker 230, respectively. In the first phase, the sentence plan generator 210 generates a potentially large sample of possible sentence plans for a given set of communicative goals generated by the communicative goal generator 210. In the second phase, the sentence-plan-ranker 220 ranks the sample sentence plans and then selects the top ranked plan to input to the realization unit 130. In ranking the generated sentence plans, the sentence plan ranker 230 may use rules automatically learned from training data stored in the training database 160, using techniques similar to those well-known to one of ordinary skill in the art.

In order to train the sentence planning system 100, neither hand-crafted rules nor the existence of a corpus in the domain of the sentence planning system 100 are necessarily needed. The trained sentence plan ranker 230 may learn to select a sentence plan whose rating on average is only 5% worse than the top human-ranked sentence plan. To further illustrate this, the sentence planning process, as well as the detailed descriptions of the sentence plan generator 220 and the sentence plan ranker 230, is set forth below.

FIG. 3 illustrates an exemplary sentence planning process using the sentence planning system 100. The process begins at step 3005 and proceeds to step 3010 where the communicative goal generator 210 receives recognition and understanding data from a dialog system and calculates the communicative goals of the particular transaction with the user. In step 3020, the communicative goal generator 210 transfers the calculated communicative goals along with the recognized/understood symbols to the sentence planning generator 220. The sentence plan generator 220 uses inputs from the discourse history database 150 to generate a plurality of sentence plans. Then, in step 3030, the generated sentence plans are ranked by the sentence plan ranker 230 using a set of rules stored in the training database 160.

The process proceeds to step 3040 where the sentence plan ranker 230 selects the highest ranked sentence plan. In step 3050, the selected sentence plan is input to the realization unit 130, which may be either a rule-based or stochastic surface realizer, for example. In the realization unit 130, linguistic rules and/or linguistic knowledge, derived from being trained using an appropriate dialog corpus, are applied to generate the surface string representation. Specifically, the types of linguistic rules or knowledge that the realization unit 130 may apply may concern the appropriate irregular verb forms, subject-verb agreement, inflecting words, word order, and the application of function words. For example, in English, the indirect object of the verb "give" is matched with the function word "to" as in the sentence "Matthew GAVE the book TO Megan". Note that for ease of discussion, "linguistic rules" as described herein will be intended to encompass either or both "linguistic rules" and/or "linguistic knowledge".

Then, in step 3060, the realized sentence plan is converted from text to speech by the text-to-speech unit 140 and is output to the user in step 3070. The text-to-speech unit 140 may be a text-to-speech engine known to those of skill in the art, such as that embodied in the AT&T NextGen TTS system, and possibly trained with lexical items specific to the domain of the sentence planning system 100. The device that outputs the converted sentence may be any device capable of producing verbal and/or non-verbal communications, such as a speaker, transducer, TV screen, CRT, or any other output device known to those of ordinary skill in the art. If the output includes speech, the automated speech may be produced by a voice synthesizer, voice recordings, or any other method or device capable of automatically producing audible sound known to those of ordinary skill in the art. The process then goes to step 3080 and ends.

In general, the role of the sentence planning system 100 is to choose abstract lexico-structural realizations for a set of communicative goals generated by the communicative goal generator 210. In contrast to conventional dialog systems that simply output completely formed utterances, the output of the above-described text-to-speech unit 140 provides the input back to the sentence planning system 100 in the form of a single spoken dialog text plan for each interaction between the system and the user.

In this process, each sentence plan generated by the sentence plan generator 220 is an unordered set of elementary speech acts encoding all of the communicative goals determined by the communicative goal generator 210 for the current user interaction. As illustrated above in Table 1, each elementary speech act is represented as a type (request, implicit confirm, explicit confirm), with type-specific parameters. The sentence planning system 100 must decide among alternative realizations of this communicative goal. Some alternative realizations are shown in Table 2, above.

As discussed above, the sentence planning task is divided by the sentence planning unit 120 into two phases. In the first phase, the sentence plan generator 220 generates 12-20 possible sentence plans, for example, for a given input communicative goal. To accomplish this, the sentence plan generator 220 assigns each speech act a canonical lexico-structural representation called a "Deep Syntactic Structure" (DSyntS). Essentially, the sentence plan is a tree that records how these elementary DSyntSs are combined into larger DSyntSs. From a sentence plan, the list of DSyntSs, each corresponding to exactly one sentence of the target communicative goal, can be read off. In the second phase, the sentence plan ranker 230 ranks sentence plans generated by the sentence plan generator 220, and then selects the top-ranked output which is then input into the realization unit 130.

In examining each of these phases, the sentence plan generator 220 performs a set of clause-combining operations that incrementally transform a list of elementary predicate-argument representations (the DSyntSs corresponding to elementary speech acts, in this case) into a list of lexico-structural representations of single sentences. As shown in FIG. 4, the sentence plan generator 220 performs this task by combining the elementary predicate-argument representations using the following combining operations:

MERGE. Two identical main matrix verbs can be identified if they have the same arguments; the adjuncts are combined.

MERGE-GENERAL. Same as MERGE, except that one of the two verbs may be embedded.

SOFT-MERGE. Same as MERGE, except that the verbs need only to be in a relation of synonymy or hyperonymy (rather than being identical).

SOFT-MERGE-GENERAL. Same as MERGE-GENERAL, except that the verbs need only to be in a relation of synonymy or hyperonymy.

CONJUNCTION. This is standard conjunction with conjunction reduction.

RELATIVE-CLAUSE. This includes participial adjuncts to nouns.

ADJECTIVE. This transforms a predicative use of an adjective into an adnominal construction.

PERIOD. Joins two complete clauses with a period.

The output of the sentence plan generator 220 is a sentence plan tree (or sp-tree for short), which is a binary tree with leaves labeled by all the elementary speech acts from the input communicative goals, and with its interior nodes labeled with clause-combining operations. Each node is also associated with a DSyntS: the leaves which correspond to elementary speech acts from the input communicative goals are linked to a canonical DSyntS for that speech act by lookup in a hand-crafted dictionary, for example. The interior nodes are associated with DSyntSs by executing their clause-combining operation on their two daughter nodes. For example, a PERIOD node results in a DSyntS headed by a period and whose daughters are the two daughter DSyntSs. As a result, the DSyntS for the entire user interaction is associated with the root node. This DSyntS can be sent to the realization unit 130, which outputs a single sentence or several sentences if the DSyntS contains period nodes.

The complexity of conventional sentence planning systems arises from the attempt to encode constraints on the application and ordering of system operations in order to generate a single high-quality sentence plan. However, in the sentence planning system 100 process of the invention there is not a need to encode such constraints. Instead, the sentence plan generator 220 generates a random sample of possible sentence plans for each communicative goal generated by the communicative goal generator 210. This may be accomplished by randomly selecting among the operations according to a probability distribution. If a clause combination fails, the sentence plan generator 220 discards that sp-tree. For example, if a relative clause of a structure which already contains a period is created, it will be discarded.

Figure 5:
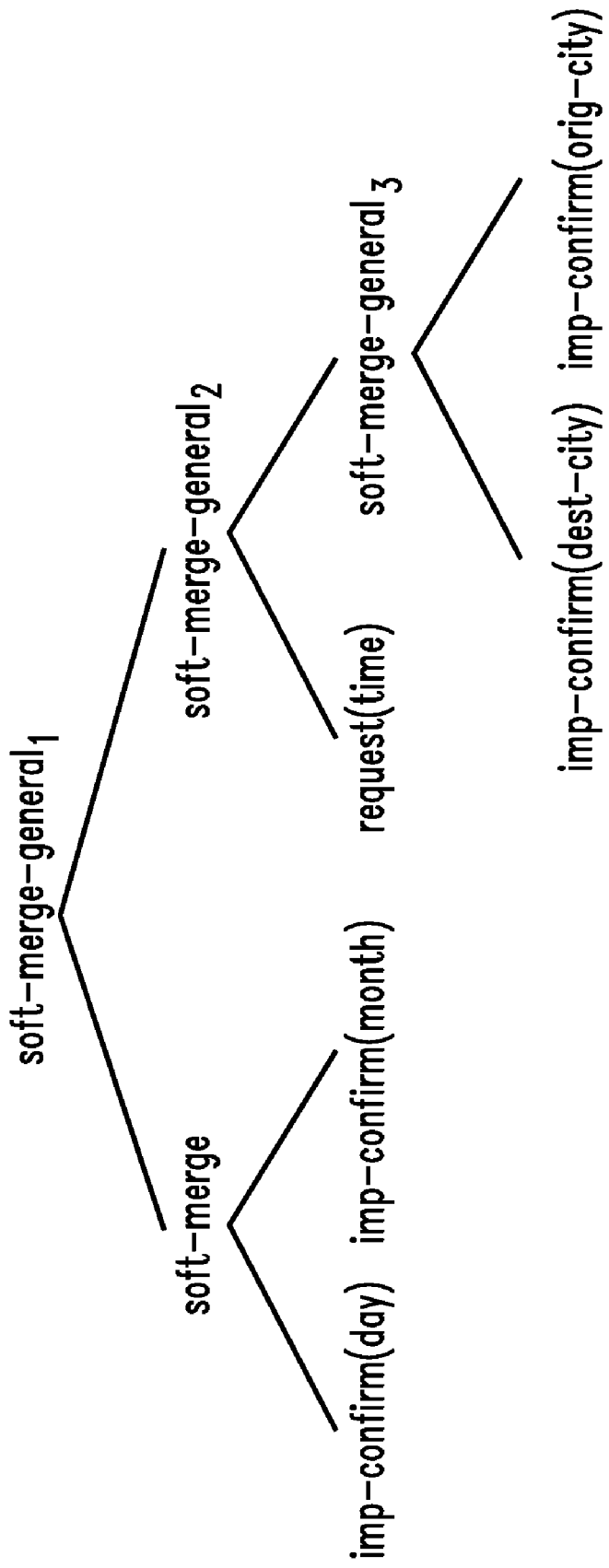
FIG. 5 illustrates an alternative zero planning tree.
Figure 6:
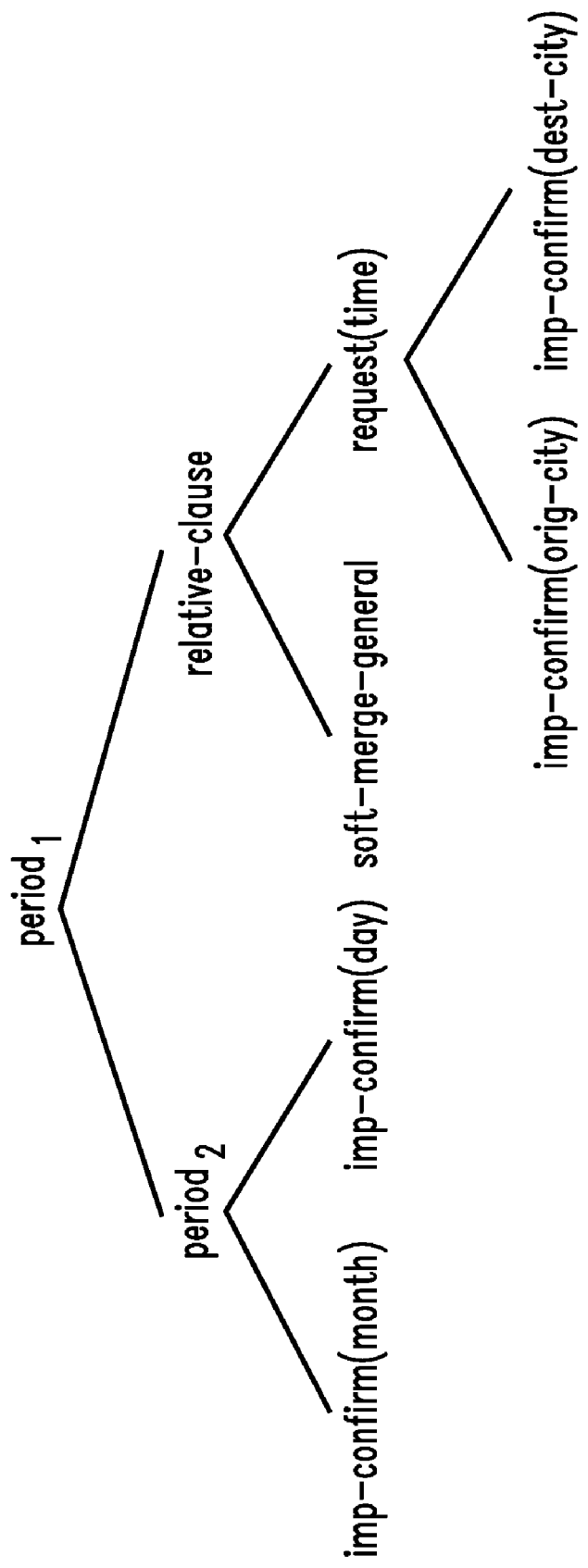
FIG. 6 illustrates an alternative eight sentence planning tree.
Figure 7:
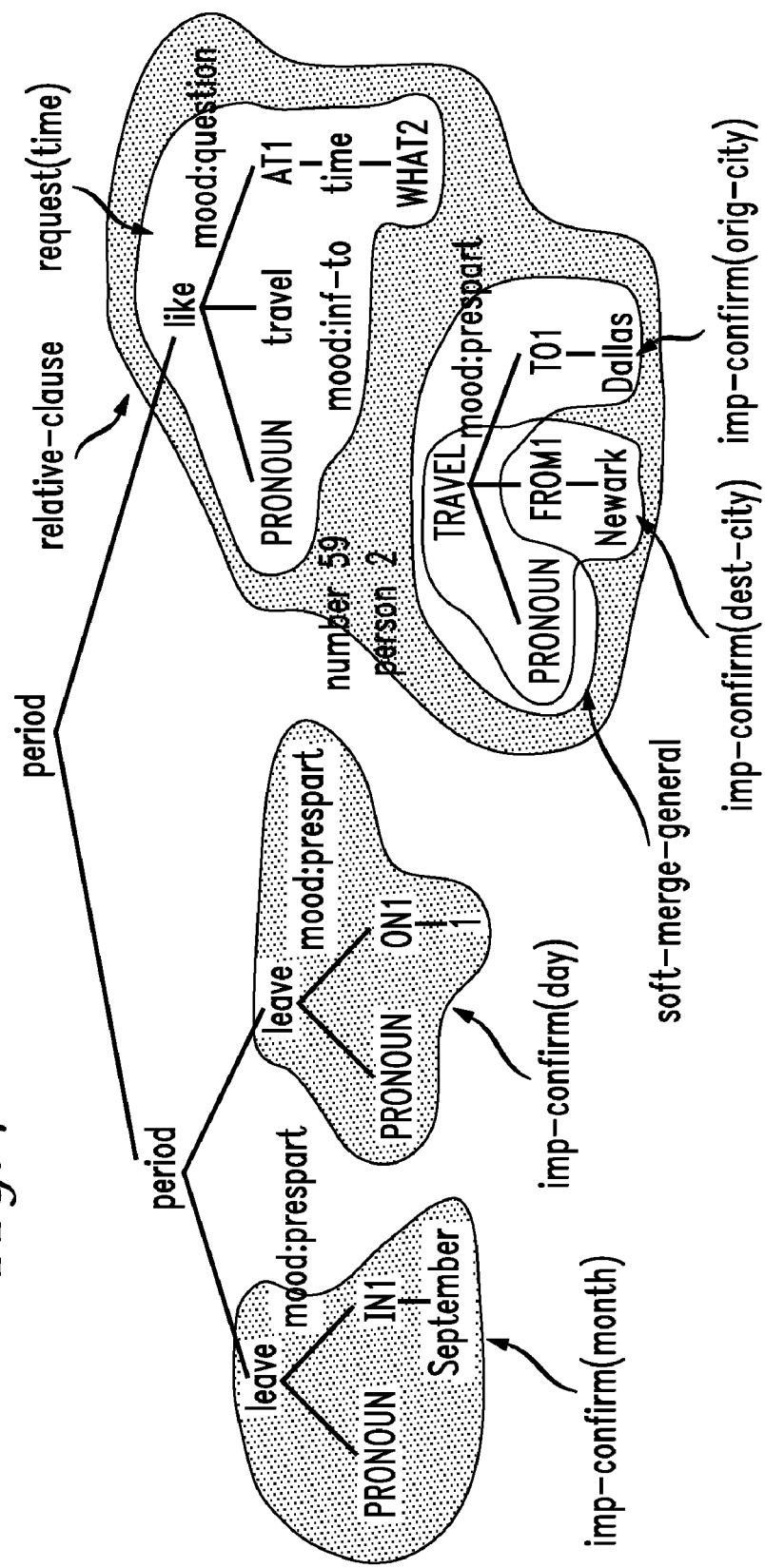
FIG. 7 illustrates an alternative eight DSYNT structure.

Table 2 above shows some of the realizations of alternative sentence plans generated by the sentence plan generator 220 for utterance systems in the sample dialog above. Sp-trees for alternatives 0, 5 and 8 are shown in FIGS. 5 and 6. For example, consider the sp-tree in FIG. 6. Node soft-merge-general merges an implicit-confirmation of the destination city and the origin city. The row labeled SOFT-MERGE in FIG. 4 shows the result of applying the soft-merge operation when Args 1 and 2 are implicit confirmations of the origin and destination cities. FIG. 7 illustrates the relationship between the sp-tree and the DSynt structure for alternative 8 from FIG. 6. The labels and arrows show the DSynt structure associated with each node in the sp-tree. The FIG. 7 diagram also shows how structures are composed into larger structures by the clause-combining operations.

The sentence plan ranker 230 takes as input a set of sentence plans generated by the sentence plan generator 220 and ranks them. As discussed above, in order to train the sentence plan ranker 230, a machine learning program may be applied to learn a set of rules for ranking sentence plans from the labeled set of sentence-plan training examples stored in the training database 160.

Examples of boosting algorithms that may be used by the sentence plan ranker 230 for ranking the generated sentence plans are described in detail below. Each example x is represented by a set of m indicator functions $h_s(x)$ for $1 \leq s \leq m$.

The indicator functions are calculated by thresholding the feature values (counts) described below. For example, one such indicator function might be:

$$h_{100}(x) = \begin{cases} 1 \text{ if LEAF} - \text{IMPLICIT} - \text{CONFIRM } (x) \geq 1 \\ 0 \text{ otherwise} \end{cases}$$

So $h_{100}=1$ if the number of leaf implicit confirm nodes in $x \geq 1$. A single parameter $a_s$ is associated with each indicator function, and the "ranking score" for an example x is then calculated as:

$$F(x) = \sum_s a_s h_s(x)$$

The sentence plan ranker 230 uses this score to rank competing realizations of the same text plan in order of plausibility. The training examples are used to set the parameter values $a_s$. In this case, the human judgments are converted into a training set of ordered pairs of examples x, y, where x and y are candidates for the same sentence, and x is strictly preferred to y. More formally, the training set τ is:

τ={(x, y)|x, y are realizations for the same text plan, x is preferred to y by human judgments}

Thus, each text plan with 20 candidates could contribute up to (20*19)/2=190 such pairs. In practice, however, fewer pairs could be contributed due to different candidates getting tied scores from the annotators.

Training is then described as a process of setting the parameters a.sub.s to minimize the following loss function:

$$\text{Loss} = \sum_{(x,y)\in\tau} e^{(F(x)-F(y))}$$

It can be seen that as this loss function is minimized, the values for (F(x)−F(y)) where x is preferred to y will be pushed to be positive, so that the number of ranking errors (cases where ranking scores disagree with human judgments) will tend to be reduced. Initially all parameter values are set to zero. The optimization method then picks a single parameter at a time, preferably the parameter that will make most impact on the loss function, and updates the parameter value to minimize the loss. The result is that substantial progress is typically made in minimizing the error rate, with relatively few non-zero parameter values. Consequently, under certain conditions, the combination of minimizing the loss function while using relatively few parameters leads to good generalization on test data examples. Empirical results for boosting have shown that in practice the method is highly effective.

FIG. 8 shows some of the rules that were learned on the training data that were then applied to the alternative sentence plans in each test set of each fold in order to rank them. Only a subset of the rules that had the largest impact on the score of each sp-tree is listed. Some particular rule examples are discussed here to help in understanding how the sentence plan ranker 230 operates. However, different thresholds and feature values may be used within the spirit and scope of the invention.

Rule (1) in FIG. 8 states that an implicit confirmation as the first leaf of the sp-tree leads to a large (0.94) increase in the score. Thus, all three of the alternative sp-trees accrue this ranking increase. Rules (2) and (5) state that the occurrence of 2 or more PRONOUN nodes in the DsyntS reduces the ranking by 0.85, and that 3 or more PRONOUN nodes reduces the ranking by an additional 0.34. Alternative 8 is above the threshold for both of these rules; alternative 5 is above the threshold for Rule (2) and alternative 0 is never above the threshold. Rule (6) on the other hand increases only the scores of alternatives 0 and 5 by 0.33 since alternative 8 is below threshold for that feature.

Although multiple instantiations of features are provided, some of which included parameters or lexical items that might identify particular discourse contexts, most of the learned rules utilize general properties of the sp-tree and the DSyntS. This is partly due to the fact that features that appeared less than 10 times in the training data were eliminated.

Figure 9:
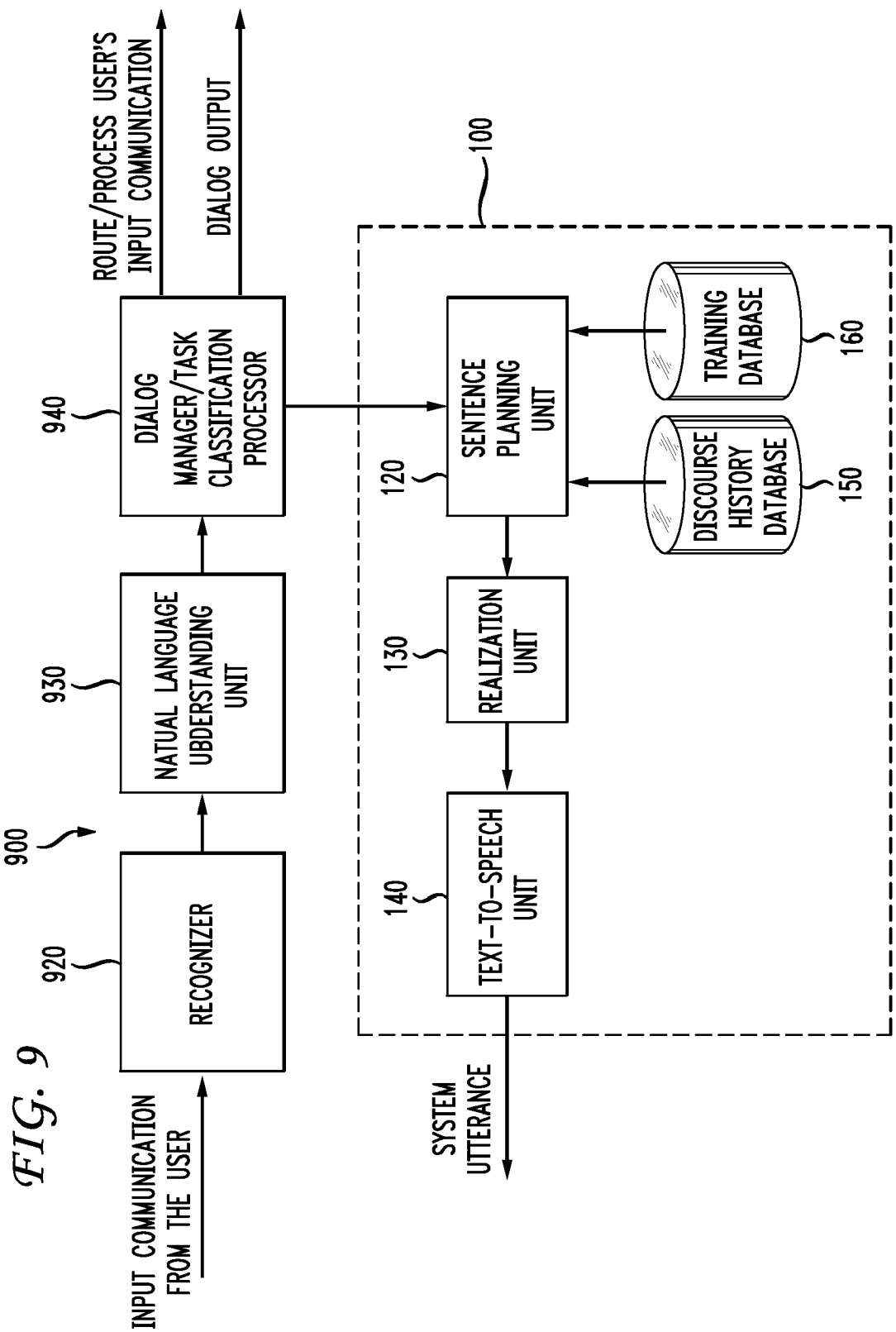
FIG. 9 illustrates an exemplary task classification system.

FIG. 9 shows an exemplary task classification system 900 that includes the sentence planning system 100. The task classification system 900 may include a recognizer 920, an NLU unit 930, a dialog manager/task classification processor 940, a sentence planning unit 120, a realization unit 130, a text-to-speech unit 140, a discourse history database 150, and a training database 160. The functions and descriptions of the sentence planning unit 120, the realization unit 130, the text-to-speech unit 140, the discourse history database 150, and the training database 160 are set forth above and will not be repeated here.

The sentence planning unit 120 receives recognition data from the recognizer 920 and understanding data from the NLU unit 930 that are based on input communications from the user. The recognizer 920 and the NLU unit 930 are shown as separate units for clarification purposes. However, the functions of the recognizer 920 and the NLU unit 930 may be performed by a single unit within the spirit and scope of this invention.

Note that the recognizer 920 may be trained to recognize any number of communication symbols, both acoustic and non-acoustic, including grammar fragments, meaningful words, meaningful phrases, meaningful phrase clusters, superwords, morphemes, multimodal signals, etc., using any of the methods known to one skilled in the art including those found in U.S. Pat. Nos. 5,675,707, 5,860,063 and 6,044,337, and U.S. patent application Ser. No. 08/943,944, Ser. No. 09/712,192 and Ser. No. 09/712,194, as discussed above.

The recognizer 920 and the NLU unit 930 may operate using one or more of a variety of recognition and understanding algorithms. For example, the recognizer 920 and the NLU unit 930 may use confidence functions to determine whether the user's input communications have been recognized and understood. The recognition and understanding data from the user's input communication may be used by the NLU unit 930 to calculate a probability that the language is understood clearly and this may be used in conjunction with other mechanisms like recognition confidence scores to decide whether and/or how to further process the user's communication.

The dialog manager/task classification processor 940 may be used to solicit clarifying information from the user in order to clear up any system misunderstanding. As a result, if the user's input communication can be satisfactorily recognized by the recognizer 920, understood by the NLU unit 930, and no further information from the user is needed, the dialog manager/task classification processor 940 routes and/or processes the user's input communication, which may include a request, comment, etc. However, if the NLU unit 930 recognizes errors in the understanding of the user's input communication such that if it cannot be satisfactorily recognized and understood, the dialog manager/task classification processor 940 may conduct dialog with the user for clarification and confirmation purposes.

The dialog manager/task classification processor 940 also may determine whether all of the communicative goals have been satisfied. Therefore, once the system has collected all of the necessary information from the user, the dialog manager/task classification processor 940 may classify and route any request or task received from the user so that it may be completed or processed by another system, unit, etc. Alternatively, the dialog manager/task classification processor 940 may process, classify or complete the task itself.

Note that while FIG. 9 shows the dialog manager/task classification processor 940 as a single unit, the functions of the dialog manager portion and the task classification processor portion may be performed by a separate dialog manager and a separate task classification processor, respectively.

As noted above, the dialog manager/task classification processor 940 may include, or perform the functions of, the communicative goal generator 210. In this regard, the dialog manager/task classification processor 940 would determine the communicative goals based on the recognized symbols and understanding data and route the communicative goals to the sentence plan generator 220 of the sentence planning unit 120.

Figure 10:
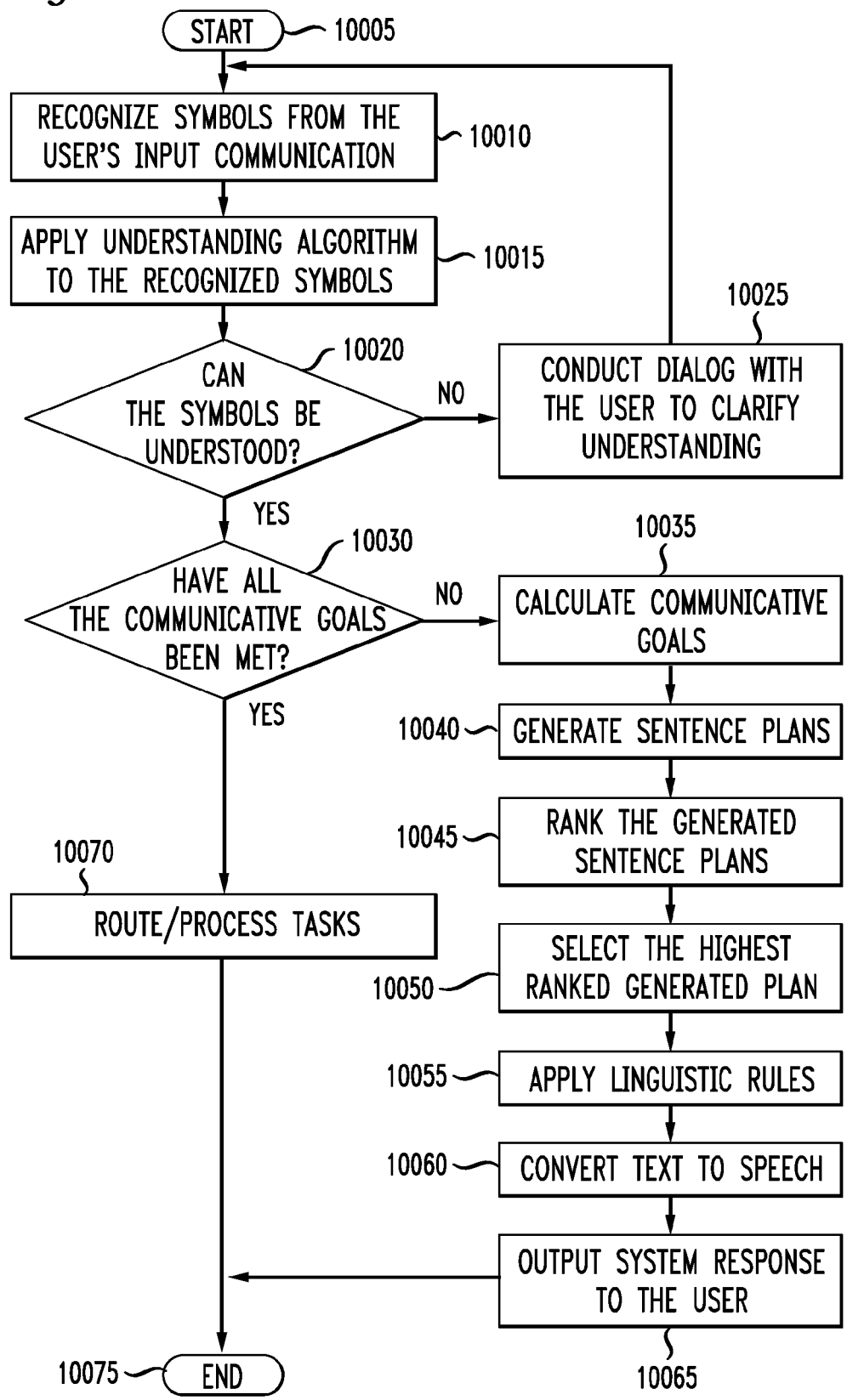
FIG. 10 illustrates an exemplary task classification process.

FIG. 10 illustrates an exemplary sentence planning process in the task classification system 900. The process begins at step 10005 and proceeds to step 10010 where the recognizer 920 receives an input communication from the user recognizes symbols from the user's input communications using a recognition algorithm known to those of skill in the art. Then, in step 10015, recognized symbols are input to the NLU unit 930 where an understanding algorithm may be applied to the recognized symbols as known to those of skill in the art.

In step 10020, the NLU unit 930 determines whether the symbols can be understood. If the symbols cannot be understood, the process proceeds to step 10025 where dialog manager/task classification processor 940 conducts dialog with the user to clarify the system's understanding. The process reverts back to step 10010 and the system waits to receive additional input from the user.

However, if the symbols can be understood in step 10020, the process proceeds to step 10030 where the dialog manager/task classification processor 940 (or the communicative goal generator 210) determines whether the communicative goals in the user transaction have been met. If so, in step 10070, the dialog manager/task classification processor 940 routes the tasks from user's request to another unit for task completion, or processes the user's communication or request, itself The process then goes to step 10070 and ends.

If the dialog manager/task classification processor 940 determines whether the communicative goals in the user transaction have not been met, the process proceeds to step 10035 where the communicative goal generator 210 (or the dialog manager/task classification processor 940) calculates the communicative goals of the particular transaction with the user using the recognition and understanding data. In step 10040, the communicative goal generator 210 transfers the calculated communicative goals along with the recognition and understanding data to the sentence planning unit 120. In the sentence planning unit 120, sentence plans are generated by the sentence plan generator 220 using input from the discourse history database 150. Then, in step 10045, the generated sentence plans are ranked by the sentence planning ranker 230.

The process proceeds to step 10050 where the sentence plan ranker 230 selects the highest ranked sentence plan. In step 10055, the selected sentence plan is input to the realization unit 130 where linguistic rules are applied. Then, in step 10060, the realized sentence plan is converted from text to speech by the text-to-speech unit 140 and is output to the user in step 10065. The process then goes to step 10070 and ends.

In the discussion herein, the terms "natural language understanding" and "sentence planning" are used to describe the understanding of a user's communication and the automated formulation of a system response, respectively. As such, this invention is directed toward the use of any form of communications received or transmitted over the networks which may be expressed verbally, nonverbally, multimodally, etc. Examples of nonverbal communications include the use of gestures, body movements, head movements, non-responses, text, keyboard entries, keypad entries, mouse clicks, DTMF codes, pointers, stylus, cable set-top box entries, graphical user interface entries, touchscreen entries, etc. Multimodal communications involve communications on a plurality of channels, such as aural, visual, etc. However, for ease of discussion, examples and discussions of the method and system of the invention are discussed above in relation to, but not limited to, verbal systems.

Note that while the above examples illustrate the invention in a travel service system, this invention may be applied to any single mode, or multimodal, dialog system, or any other automated dialog system that interacts with a user. Furthermore, the invention may apply to any automated recognition and understanding system that receives communications from external sources, such as users, customers, service providers, associates, etc. Consequently, the method may operate in conjunction with one or more communication networks, including a telephone network, the Internet, an intranet, Cable TV network, a local area network (LAN), a wireless communication network, etc.

In addition, while the examples above concern travel service systems, the sentence planning system 100 of the invention may be used in a wide variety of systems or purposes known to those of skill in the art, including parts ordering systems, customer care systems, reservation systems (including dining, car, train, airline, bus, lodging, travel, touring, etc.), navigation systems, information collecting systems, information retrieval systems, etc., within the spirit and scope of the invention.

As shown in FIGS. 1, 2, and 9, the method of this invention may be implemented using a programmed processor. However, the method can also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a PLD, PLA, FPGA, or PAL, or the like. In general, any device on which the finite state machine capable of implementing the flowcharts shown in FIGS. 3 and 10 can be used to implement the functions of this invention.

While the invention has been described with reference to the above embodiments, it is to be understood that these embodiments are purely exemplary in nature. Thus, the invention is not restricted to the particular forms shown in the foregoing embodiments. Various modifications and alterations can be made thereto without departing from the spirit and scope of the invention.

We claim:

1. A method of managing a dialog with a user, the method comprising:

generating communicative goals based on a communication received from the user, the communicative goals being related to further information needed from the user in addition to information in the communication;

generating a plurality of prompts, each prompt of the plurality of prompts being a viable and potentially usable prompt in response to the communication received from the user and generated in response to the communication from the user based on the communicative goals;

ranking the plurality of prompts independent of the user; and outputting to the user an output prompt based on the ranking of the plurality of prompts.

2. The method of claim 1, wherein the output prompt is chosen from the plurality of prompts.

3. The method of claim 1, further comprising:
applying a set of linguistic rules to the output prompt.

4. The method of claim 1, wherein ranking the plurality of prompts is performed using a set of learned rules in a training database.

5. The method of claim 1, wherein generating the plurality of prompts is performed using interaction information in a discourse history database that comprises the interaction information, the interaction information being related to a set of interactions between the user and the automated dialog system.

6. The method of claim 1, wherein the communication comprises a nonverbal communication.

7. The method of claim 6, wherein the nonverbal communication comprises at least one of a gesture, a body movement, a head movement, a non-response, text, a keyboard entry, a keypad entry, a mouse click, a DTMF code, a pointer, a stylus, a cable set-top box entry, a graphical user interface entry, and a touchscreen entry.

8. The method of claim 1, wherein generating the communicative goals further comprises confirming information previously obtained from the user.

9. The method of claim 1, further comprising:
converting at least one of the ranked appropriate prompts from text to speech.

10. The method of claim 1, wherein the method is processed in one of a customer care system, a reservation system, a parts ordering system, a navigation system, an information gathering system, and an information retrieval system.

11. A system of managing a dialog with a user, the system comprising:
a processor;
a first module controlling the processor to generate communicative goals based on a communication received from the user, the communicative goals being related to further information needed from the user in addition to information in the communication;
a second module controlling the processor to generate a plurality of prompts, the plurality of prompts being a viable and potentially usable prompt in response to the communication received from the user and generated in response to the communication from the user based on the communicative goals;
a third module controlling the processor to rank the plurality of prompts independent of the user; and
a fourth module controlling the processor to output to the user an output prompt based on the ranking of the plurality of appropriate prompts.

12. The system of claim 11, wherein the fourth module outputs the output prompt based on the plurality of prompts.

13. The system of claim 11, further comprising a fifth module controlling the processor to apply a set of linguistic rules to the output prompt.

14. The system of claim 11, wherein the third module ranks the plurality of prompts by using a set of learned rules in a training database.

15. The system of claim 11, wherein the second module generates the plurality of prompts by using interaction information in a discourse history database that comprises the interaction information, the interaction information being related to a set of interactions between the user and the automated dialog system.

16. The system of claim 11, wherein the communication comprises a nonverbal communication.

17. The system of claim 16, wherein the nonverbal communication comprises at least one of a gesture, a body movement, a head movement, a non-response, text, a keyboard entry, a keypad entry, a mouse click, a DTMF code, a pointer, a stylus, a cable set-top box entry, a graphical user interface entry, and a touchscreen entry.

18. The system of claim 11, wherein the first module further controls the processor to confirm information previously obtained from the user.

19. The system of claim 11, further comprising a fifth module controlling the processor to convert at least one of the ranked appropriate prompts from text to speech.

20. The system of claim 11, wherein the system comprises at least one of a customer care system, a reservation system, a parts ordering system, a navigation system, an information gathering system, and an information retrieval system.

21. A non-transitory computer-readable storage medium storing instructions, which causes a device to manage a dialog with a user, the instructions comprising:
generating via a processor communicative goals based on a communication received from the user, the communicative goals being related to further information needed from the user in addition to information in the communication;
generating via the processor a plurality of prompts, each prompt of the plurality of prompts being a viable and potentially usable prompt in response to the communication received from the user and generated in response to the communication from the user based on the communicative goals;
ranking via the processor the plurality of prompts independent of the user; and
outputting to the user via the processor an output prompt based on the ranking of the plurality of prompts.

22. The non-transitory computer-readable storage medium of claim 21, wherein the output prompt is chosen from the plurality of prompts.

* * * * *